G. AMBORN.
TOOL HOLDER.
APPLICATION FILED JULY 17, 1913.
1,110,281.
Patented Sept. 8, 1914.
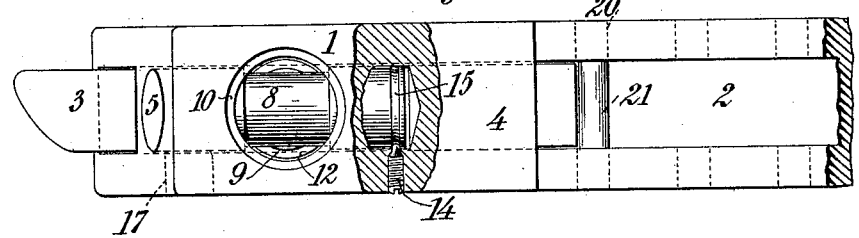
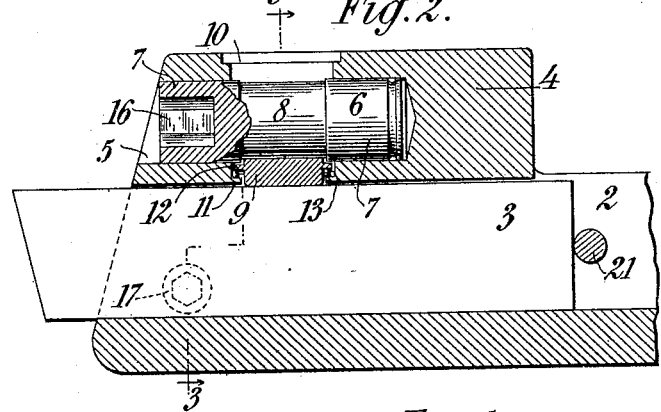
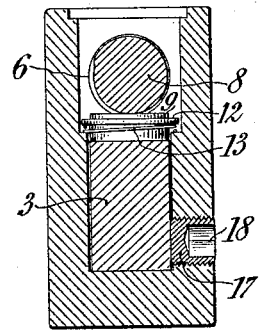
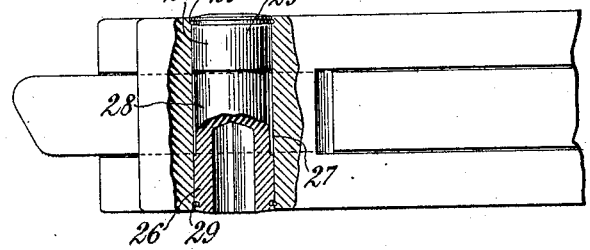
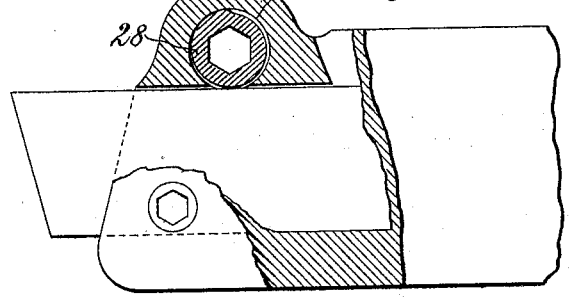
WITNESSES:
René Bruine
J. J. Wallace
INVENTOR:
George Amborn
By Attorneys,
Fraser, Turk & Nusle
THE NORRIS PETERS CO., PHOTO-LITHO., WASHINGTON, D. C.

UNITED STATES PATENT OFFICE.

GEORGE AMBORN, OF CHAPINVILLE, CONNECTICUT, ASSIGNOR TO J. H. WILLIAMS & CO., OF BROOKLYN, NEW YORK, A CORPORATION OF NEW YORK.

TOOL-HOLDER.

1,110,281.  Specification of Letters Patent.  Patented Sept. 8, 1914.

Application filed July 17, 1913. Serial No. 779,601.

*To all whom it may concern:*

Be it known that I, GEORGE AMBORN, a citizen of the United States, residing at Chapinville, in the county of Litchfield and State of Connecticut, have invented certain new and useful Improvements in Tool-Holders, of which the following is a specification.

This invention relates to tool holders designed for heavy work, and aims to provide improvements therein.

The invention provides a strong, durable and simply constructed holder, which can be operated to quickly clamp and unclamp tools therein, which will hold the tool with great security when clamped therein, and which has no unnecessary projecting parts to get in the way of parts of the lathe or work, or which would prove dangerous or cause injury to a workman.

Other features of improvement will hereinafter appear.

Several embodiments of the invention are illustrated in the accompanying drawings.

Figure 1 is a top plan view of a tool holder embodying the invention; Fig. 2 is a longitudinal sectional view of the construction shown in Fig. 1; Fig. 3 is a cross section on the line 3—3, Fig. 2; Fig. 4 illustrates a second embodiment of the invention; and Fig. 5 is a top plan view, with parts in section, of the construction illustrated in Fig. 4.

In said drawings, 1 designates the body of a tool holder having a longitudinal channel or recess 2 therein adapted to receive the shank of a cutting tool or the like 3. The front end of the tool holder is provided with a boss 4 extending over the recess in the tool holder, and having a recess 5 therein adapted to receive a cam piece 6 for clamping the tool in the tool holder. The cam piece 6 has rounded ends 7 which are journaled in the recess and a cam portion 8 which preferably bears upon a tool through the intermediary of a clamping plate 9. The cam piece 6 and the recess 5 within which the cam piece is contained is preferably disposed longitudinally of the tool holder. By this arrangement the proportions of the cam piece do not affect the width of the tool holder.

The clamping plate 9 is preferably contained in a vertical recess 10 having a shoulder 11 at its lower end adapted to cooperate with a flange 12 on the clamping plate 9 for preventing the latter from passing downwardly through the recess. A spring 13 is preferably arranged between the flange 12 of the clamping plate and the shoulder 11 for pressing the clamping plate upwardly out of the tool recess 2, so as to normally press the clamping plate out of the way of a tool when the tool is inserted in the recess. A screw-threaded pin 14 is preferably provided for engaging a groove 15 in the cam piece 6, for retaining the latter in place within the recess 5.

The cam piece 6 is preferably provided with an internal socket 16 adapted to receive the square or hexagonal end of a wrench. By this construction it is not necessary that any part of the cam piece 6 project outside of the socket 5.

A set screw 17 is preferably provided in a side of the tool holder for pressing the tool firmly against the side of the recess 2. The set screw is preferably arranged near the bottom of the tool receiving recess. The set screw is also preferably provided with an internal socket 18 adapted to receive the square or hexagonal end of a wrench. The tool holder may also be provided with a series of holes 20 adapted to receive a pin or rod 21, which rod is adapted to bear against the end of a tool and prevent longitudinal movement of the tool in the tool holder.

In Figs. 4 and 5 the cam piece 25 is shown as bearing directly upon the upper side of the tool. This cam piece 25 is constructed similarly to the cam piece 6 and has rounded ends 26 bearing in the recess 27, and has a cam portion 28 intermediate its ends. Split rings 29 are preferably provided for retaining the cam piece 25 in the recess 27. These split rings 29 engage grooves in the sides of the recess 27 and in the ends of the cam piece.

Modifications may be made in the construction illustrated and described without departing from the spirit of the invention, as set forth in the claims annexed.

What is claimed is:—

1. A tool holder having a tool recess therein, a bottom wall, and side walls on either side of said recess, a boss extending across the top of said recess, and a cam piece housed within said boss.

2. A tool holder having a tool recess longitudinally therein, a cam piece, and a recess longitudinally of said tool holder for containing said cam piece.

3. A tool holder having a tool recess therein, a cam piece, a recess longitudinally of said tool holder for containing said cam piece, a bore at right angles to said cam-piece recess and a clamping plate within said bore, intermediate said cam piece and a tool within said holder.

4. A tool holder having a tool receiving recess therein and side walls at either side of said recess, means for clamping a tool against the lower side of said recess, and means in one of said side walls for pressing a tool against the side wall at the other side of said recess.

5. A tool holder having a tool receiving recess therein and side walls at either side of said recess, means for clamping a tool against the lower side of said recess, and means in one of said side walls for pressing a tool against the side wall at the other side of said recess, said means being flush with the outer face of said side wall.

6. A tool holder having a tool receiving recess therein and side walls at either side of said recess, means for clamping a tool against the lower side of said recess, means in one of said side walls for pressing a tool against the side wall at the other side of said recess, and means for engaging the end of a tool in said recess for preventing longitudinal movement thereof.

7. A tool holder having a tool recess therein and a bore adjacent said recess, a cam-piece in said bore, a second bore at right angles to said first bore and a clamping plate in said second bore intermediate said cam-piece and a tool in said tool holder, said tool holder and plate having means inside said second bore for preventing said clamping plate falling into said tool recess.

8. A tool holder having a tool recess therein, a cam-piece and a clamping plate intermediate said cam-piece and a tool in said tool holder, said tool holder having means for preventing said clamping plate falling into said tool recess, and a spring for pressing said clamping plate out of said tool recess, whereby said clamping plate will not project into the way of tools when inserted in said tool holder.

In witness whereof I have hereunto signed my name in the presence of two subscribing witnesses.

GEORGE AMBORN.

Witnesses:
WILLIAM G. COLE,
CHARLES E. AHRENSFIELD.

Copies of this patent may be obtained for five cents each, by addressing the "Commissioner of Patents, Washington, D. C."